United States Patent
Xu et al.

(10) Patent No.: US 12,006,228 B2
(45) Date of Patent: Jun. 11, 2024

(54) PREPARATION METHOD FOR HIGH DENSITY ALUMINUM DOPED COBALT OXIDE

(71) Applicant: GEM (Jiangsu) Cobalt Industry Co., Ltd., Jiangsu (CN)

(72) Inventors: Kaihua Xu, Jiangsu (CN); Zhenkang Jiang, Jiangsu (CN); Aiqing Zhang, Jiangsu (CN); Bingzhong Li, Jiangsu (CN); Chao Wang, Jiangsu (CN); Dongwei Xu, Jiangsu (CN)

(73) Assignee: GEM (JIANGSU) COBALT INDUSTRY CO., LTD., Taizhou (CN)

( * ) Notice: Subject to any disclaimer, the term of this patent is extended or adjusted under 35 U.S.C. 154(b) by 85 days.

(21) Appl. No.: 17/842,761

(22) Filed: Jun. 16, 2022

(65) Prior Publication Data
US 2022/0315444 A1   Oct. 6, 2022

Related U.S. Application Data

(63) Continuation of application No. PCT/CN2019/126213, filed on Dec. 18, 2019.

(30) Foreign Application Priority Data

Dec. 17, 2019 (CN) .......................... 201911303146.2

(51) Int. Cl.
*H01M 4/525* (2010.01)
*C01G 51/04* (2006.01)

(52) U.S. Cl.
CPC ............. *C01G 51/04* (2013.01); *H01M 4/525* (2013.01); *C01P 2002/54* (2013.01); *C01P 2002/74* (2013.01); *C01P 2004/61* (2013.01); *C01P 2006/40* (2013.01)

(58) Field of Classification Search
None
See application file for complete search history.

(56) References Cited

FOREIGN PATENT DOCUMENTS

| CN | 109354075 A | 2/2019 |
|----|-------------|--------|
| CN | 110078132 A | 8/2019 |

*Primary Examiner* — Tanisha Diggs

(57) ABSTRACT

The present invention discloses a preparation method for high density aluminum doped cobalt oxide, which comprises following steps: 1) adding a cobalt salt solution, an alkaline solution and an oxidizer to a reactor for reaction; adding an aluminum cobalt solution to the reaction system for reaction; stopping adding the aluminum cobalt solution after D50 reaches 3.5-4.0 μm, stopping the reaction when D50 reaches the desired particle size, thus obtaining aluminiferous cobalt oxyhydroxide slurry; 2) aging, dehydrating, washing and drying the aluminiferous cobalt oxyhydroxide slurry, thus obtaining aluminiferous cobalt oxyhydroxide powder; 3) calcining the aluminiferous cobalt oxyhydroxide powder, thus obtaining the target object. With the method of the present invention, doped aluminum can be perfectly embedded into cobalt oxide lattices, thus effectively enhancing the tap density and uniformity of aluminum doped cobalt oxide and improving the cycle performance and charge-discharge performance of batteries.

18 Claims, 1 Drawing Sheet

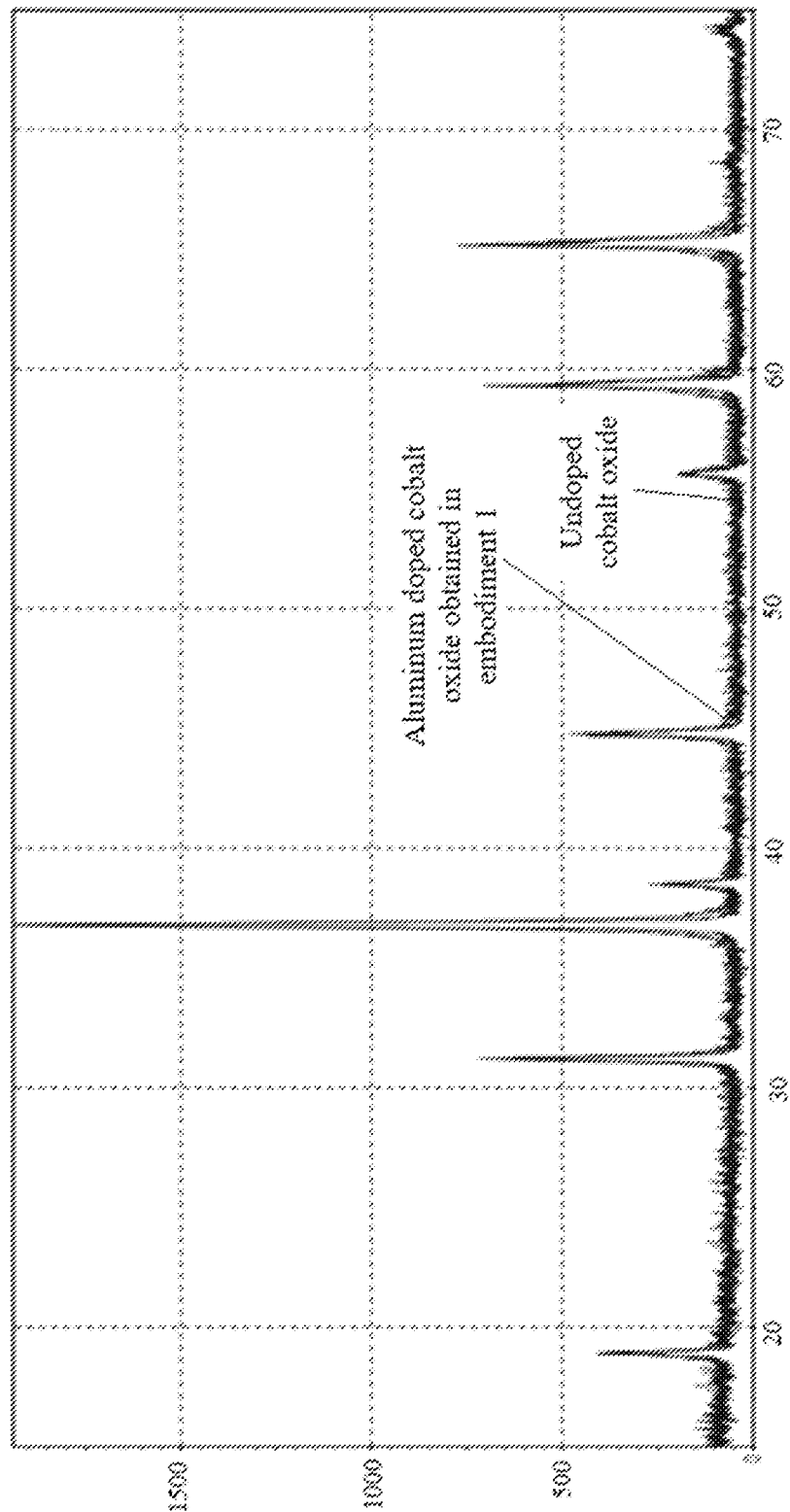

PREPARATION METHOD FOR HIGH DENSITY ALUMINUM DOPED COBALT OXIDE

CROSS-REFERENCE TO RELATED APPLICATION

The present application is a continuation application of PCT application No. PCT/CN2019/126213 filed on Dec. 18, 2019, which claims the benefit of Chinese Patent Application No. 201911303146.2 filed on Dec. 17, 2019, each of which is incorporated by reference herein in its entirety.

FIELD OF INVENTION

The present invention belongs to the technical field of preparation of cobalt oxide, and particularly relates to a preparation method for high density aluminum doped cobalt oxide.

BACKGROUND ART OF THE INVENTION

As a new type of energy, lithium ion batteries have the advantages of high energy, long service life and low pollution and are widely used in various fields such as mobile phones, computers, electric vehicles and national defense. 3C electronic products need to be light and compact, and corresponding batteries need to have high energy density, wherein the positive electrode material directly determines the performance of the final lithium ion batteries, and the energy density of lithium cobalt oxide used as the most important positive electrode material of 3C electronic products determines the energy density of lithium ion batteries to a certain extent. High voltage lithium cobalt oxide has the characteristic of high gram volume, has higher energy density than conventional lithium cobalt oxide, and is the main direction of research and development of lithium cobalt oxide in the future.

DISCLOSURE OF THE INVENTION

In view of this, the present application provides a preparation method for high density aluminum doped cobalt oxide, which solves the problems of poor cycle performance and poor charge-discharge performance of batteries caused by uneven aluminum doping and low tap density of aluminum doped cobalt oxide prepared in the prior art.

To achieve the above purpose, the technical solution of the present invention is realized as follows: a preparation method for high density aluminum doped cobalt oxide, comprising the following steps:
Step 1: adding a cobalt salt solution, an alkaline solution and an oxidizer to a reactor for coprecipitation reaction; adding an aluminum cobalt solution to the reaction system for reaction after D50 reaches 2.0-2.5 μm; and stopping adding the aluminum cobalt solution after D50 reaches 3.5-4.0 μm, keeping other conditions unchanged, continuing the reaction, and stopping the reaction when D50 reaches the desired particle size, thus obtaining aluminiferous cobalt oxyhydroxide slurry;
Step 2: aging, dehydrating, washing and drying the aluminiferous cobalt oxyhydroxide slurry obtained in step 1, thus obtaining aluminiferous cobalt oxyhydroxide powder;
Step 3: calcining the aluminiferous cobalt oxyhydroxide powder obtained in step 2, thus obtaining high density aluminum doped cobalt oxide.

Preferably, in step 1, a specific method of stopping adding the aluminum cobalt solution after D50 reaches 3.5-4.0 μm, keeping other conditions unchanged, continuing the reaction, and stopping the reaction when D50 reaches the desired particle size is as follows:

Preferably, after D50 reaches 3.5-4.0 μm, stopping adding the aluminum cobalt solution and continuing adding the cobalt salt solution; after liquid in the reactor overflows, thickening the overflowing slurry, draining supernatant, returning the thick slurry to the reactor to continue reaction, and stopping the reaction when D50 reaches the desired particle size.

Preferably, in step 1, the feed rate of the cobalt salt solution is 220-260 L/h, the feed rate of the alkaline solution is 50-150 L/h, the feed rate of the oxidizer is 20-30 L/h, and the stirring rate during feeding is 300-600 rpm.

Preferably, in step 1, the concentration of cobalt ions in the cobalt salt solution is 120-140 g/L, the concentration of the alkaline solution is 80-150 g/L, and the oxidizer is one of air, oxygen or hydrogen peroxide.

Preferably, in step 1, the concentration of cobalt in the aluminum cobalt solution is 120-140 g/L, and the concentration ratio of cobalt ions to aluminum ions in the aluminum cobalt solution is 100:0.5-1.

Preferably, the cobalt salt solution and the aluminum cobalt solution both contain a complexing agent, and the concentration ratio of cobalt ions to the complexing agent in the cobalt salt solution is 0.04-0.1; and the concentration ratio of cobalt ions to the complexing agent in the aluminum cobalt solution is 0.04-0.1.

Preferably, in step 1, the reactor contains a base solution with the pH value of 9-11.

Preferably, in step 2, deionized water of 80-90° C. is used for washing, and the drying temperature is 120-180° C.

Preferably, in step 3, the calcining temperature is 500-750° C., and the calcining time is 10-20 h. Preferably, the method also comprises a step of washing and drying the high density aluminum doped cobalt oxide obtained in step 3.

Compared with the prior art, the present invention enables doped aluminum to be perfectly embedded into cobalt oxide lattices by the method of adding a cobalt salt solution for coprecipitation reaction first and then adding an aluminum cobalt solution for coprecipitation reaction after a certain particle size is reached, thus effectively enhancing the tap density and uniformity of aluminum doped cobalt oxide and improving the cycle performance and charge-discharge performance of batteries.

DESCRIPTION OF THE DRAWINGS

The sole FIGURE is a comparative analysis diagram of XRD of high density aluminum doped cobalt oxide obtained in embodiment 1 of the present invention and undoped cobalt oxide.

DETAILED DESCRIPTION OF THE INVENTION

To make the purpose, the technical solution and the advantages of the present invention more clear, the present invention will be further described below in detail in combination with specific embodiments. It should be understood that the specific embodiments described herein are only used for explaining the present invention, not used for limiting the present invention.

The present invention uses a laser particle size analyzer to measure the particle size in the process of generating aluminum doped cobalt oxide and the particle size of aluminum doped cobalt oxide finally obtained, and chemical reagents used in embodiments of the present invention are obtained through conventional commercial channels unless otherwise specified.

A preparation method for high density aluminum doped cobalt oxide provided by embodiments of the present invention, comprising the following steps:

Step 1: adding a cobalt salt solution, an alkaline solution and an oxidizer to a reactor containing a base solution with the pH value of 9-11 for coprecipitation reaction; adding an aluminum cobalt solution to the reaction system for reaction after D50 reaches 2.0-2.5 μm; stopping adding the aluminum cobalt solution and continuing adding the cobalt salt solution after D50 reaches 3.5-4.0 μm; and after liquid in the reactor overflows, thickening the overflowing slurry, draining supernatant, returning the thick slurry to the reactor to continue reaction, and stopping the reaction when D50 reaches the desired particle size, thus obtaining aluminiferous cobalt oxyhydroxide slurry;

Wherein the feed rate of the cobalt salt solution is 220-260 L/h, preferably 240 L/h; the feed rate of the alkaline solution is 50-150 L/h, preferably 100 L/h; the feed rate of the oxidizer is 20-30 L/h, preferably 25 L/h; the stirring rate during feeding is 300-600 rpm, preferably 500 rpm; the concentration of cobalt ions in the cobalt salt solution is 120-140 g/L, preferably 130 g/L; the concentration of the alkaline solution is 80-150 g/L, preferably 100 g/L, and the oxidizer is one of air, oxygen or hydrogen peroxide; cobalt salt is one of cobalt chloride, cobalt sulfate and cobalt nitrate, preferably cobalt sulfate; aluminum salt in the aluminum cobalt solution is aluminum sulfate or aluminum nitrate, preferably aluminum sulfate; the concentration ratio of cobalt ions to aluminum ions in the aluminum cobalt solution is 100:0.5-1, preferably 100:0.85. the cobalt salt solution and the aluminum cobalt solution both contain a complexing agent, and the concentration ratio of cobalt ions to the complexing agent in the cobalt salt solution is 0.04-0.1, preferably 0.07; the concentration ratio of cobalt ions to the complexing agent in the aluminum cobalt solution is 0.04-0.1, preferably 0.07; and the complexing agent is one of ammonia water, ethylenediamine, ethylene diamine tetraacetic acid and citric acid, preferably ammonia water.

Step 2: aging, dehydrating, washing and drying the aluminiferous cobalt oxyhydroxide slurry obtained in step 1, thus obtaining aluminiferous cobalt oxyhydroxide powder; wherein deionized water of 80-90° C. is used for washing, and the drying temperature is 120-180° C.;

Step 3: calcining the aluminiferous cobalt oxyhydroxide powder obtained in step 2 at 500-750° C. for 10-20 h, thus obtaining high density aluminum doped cobalt oxide;

Further, the method also comprises a step of washing and drying the high density aluminum doped cobalt oxide obtained in step 3.

To better explain the technical solution of the present invention, the present invention is further described below in combination with specific embodiments.

Embodiment 1

High density aluminum doped cobalt oxide provided by embodiment 1 of the present invention is prepared by the following steps:

Step 1: adding a cobalt sulfate solution with the concentration of 130 g/L, an alkaline solution with the concentration of 100 g/L and air to a reactor containing a base solution with the pH value of 9-11 respectively at feed rates of 240 L/h, 100 L/h and 25 L/h at a stirring rate of 500 rpm for coprecipitation reaction; adding an aluminum cobalt sulfate solution with the concentration ratio of cobalt ions to aluminum ions of 100:0.8 to the reaction system for reaction after D50 reaches 2.2 μm; stopping adding the aluminum cobalt sulfate solution and continuing adding the cobalt sulfate solution after D50 reaches 3.8 μm; and after liquid in the reactor overflows, thickening the overflowing slurry, draining supernatant, returning the thick slurry to the reactor to continue reaction, and stopping the reaction when D50 reaches the desired particle size of 5 μm, thus obtaining aluminiferous cobalt oxyhydroxide slurry;

Wherein the cobalt sulfate solution and the aluminum cobalt sulfate solution both contain a complexing agent, and the concentration ratio of cobalt ions to ammonia water as the complexing agent in the cobalt sulfate solution is 0.07; and the concentration ratio of cobalt ions to ammonia water as the complexing agent in the aluminum cobalt sulfate solution is 0.07;

Step 2: aging, dehydrating, washing and drying the aluminiferous cobalt oxyhydroxide slurry obtained in step 1, thus obtaining aluminiferous cobalt oxyhydroxide powder;

Wherein deionized water of 80-90° C. is used for washing, and the drying temperature is 150° C.;

Step 3: calcining the aluminiferous cobalt oxyhydroxide powder obtained in step 2 at 600° C. for 15 h, washing with deionized water of 80-90° C., and then drying at 150° C., thus obtaining high density aluminum doped cobalt oxide.

Embodiment 2

High density aluminum doped cobalt oxide provided by embodiment 2 of the present invention is prepared by the following steps:

Step 1: adding a cobalt sulfate solution with the concentration of 130 g/L, an alkaline solution with the concentration of 100 g/L and air to a reactor containing a base solution with the pH value of 9-11 respectively at feed rates of 240 L/h, 100 L/h and 25 L/h at a stirring rate of 500 rpm for coprecipitation reaction; adding an aluminum cobalt sulfate solution with the concentration ratio of cobalt ions to aluminum ions of 100:0.8 to the reaction system for reaction after D50 reaches 2.0 μm; stopping adding the aluminum cobalt sulfate solution and continuing adding the cobalt sulfate solution after D50 reaches 3.5 μm; and after liquid in the reactor overflows, thickening the overflowing slurry, draining supernatant, returning the thick slurry to the reactor to continue reaction, and stopping the reaction when D50 reaches the desired particle size of 4 μm, thus obtaining aluminiferous cobalt oxyhydroxide slurry;

Wherein the cobalt sulfate solution and the aluminum cobalt sulfate solution both contain ammonia water as a complexing agent, and the concentration ratio of cobalt ions to ammonia water as the complexing agent in the cobalt sulfate solution is 0.07; and the concentration ratio of cobalt ions to ammonia water as the complexing agent in the aluminum cobalt sulfate solution is 0.07;

Step 2: aging, dehydrating, washing and drying the aluminiferous cobalt oxyhydroxide slurry obtained in step 1, thus obtaining aluminiferous cobalt oxyhydroxide powder;

Wherein deionized water of 80-90° C. is used for washing, and the drying temperature is 150° C.;

Step 3: calcining the aluminiferous cobalt oxyhydroxide powder obtained in step 2 at 500° C. for 20 h, washing with deionized water of 80-90° C., and then drying at 150° C., thus obtaining high density aluminum doped cobalt oxide.

Embodiment 3

High density aluminum doped cobalt oxide provided by embodiment 3 of the present invention is prepared by the following steps:

Step 1: adding a cobalt sulfate solution with the concentration of 130 g/L, an alkaline solution with the concentration of 100 g/L and air to a reactor containing a base solution with the pH value of 9-11 respectively at feed rates of 240 L/h, 100 L/h and 25 L/h at a stirring rate of 500 rpm for coprecipitation reaction; adding an aluminum cobalt sulfate solution with the concentration ratio of cobalt ions to aluminum ions of 100:0.8 to the reaction system for reaction after D50 reaches 2.5 μm; stopping adding the aluminum cobalt sulfate solution and continuing adding the cobalt sulfate solution after D50 reaches 4 μm; and after liquid in the reactor overflows, thickening the overflowing slurry, draining supernatant, returning the thick slurry to the reactor to continue reaction, and stopping the reaction when D50 reaches the desired particle size of 6 μm, thus obtaining aluminiferous cobalt oxyhydroxide slurry;

Wherein the cobalt sulfate solution and the aluminum cobalt sulfate solution both contain ammonia water as a complexing agent, and the concentration ratio of cobalt ions to ammonia water as the complexing agent in the cobalt sulfate solution is 0.07; and the concentration ratio of cobalt ions to ammonia water as the complexing agent in the aluminum cobalt sulfate solution is 0.07;

Step 2: aging, dehydrating, washing and drying the aluminiferous cobalt oxyhydroxide slurry obtained in step 1, thus obtaining aluminiferous cobalt oxyhydroxide powder;

Wherein deionized water of 80-90° C. is used for washing, and the drying temperature is 150° C.;

Step 3: calcining the aluminiferous cobalt oxyhydroxide powder obtained in step 2 at 750° C. for 10 h, washing with deionized water of 80-90° C., and then drying at 150° C., thus obtaining high density aluminum doped cobalt oxide.

In order to verify whether aluminum in the high density aluminum doped cobalt oxide prepared by the present embodiment is evenly doped into cobalt oxide, the aluminum doped cobalt oxide obtained in embodiment 1 and undoped cobalt oxide are tested by XRD, as shown in the sole FIGURE. It can be seen from the sole FIGURE that the high density aluminum doped cobalt oxide obtained by the present invention has a peak pattern completely consistent with the peak pattern of the undoped cobalt oxide and has no miscellaneous peak, which indicates that aluminum of the present invention is evenly doped into cobalt oxide lattices.

Reference Example

Aluminum doped cobalt oxide provided by the reference example is prepared by the following method:

Step 1: adding a cobalt sulfate solution, an alkaline solution and an oxidizer which have the same concentration in embodiment 1 to a reactor containing a base solution by parallel flows at the same feed rate, and adding sodium meta aluminate at the same time; after liquid in the reactor overflows, thickening the overflowing slurry, draining supernatant, returning the thick slurry to the reactor to continue reaction, and stopping the reaction when D50 reaches the particle size of 5 μm, thus obtaining aluminiferous cobalt oxyhydroxide slurry;

Step 2 and step 3 are the same as those described in embodiment 1, finally obtaining aluminum doped cobalt oxide.

The aluminum content, the tap density and the specific surface area of aluminum doped cobalt oxide prepared in embodiments 1-3 and the reference example are tested, and the test results are shown as follows:

TABLE 1

| | Aluminum content/% | Tap density (g/cm$^3$) | Specific surface area (m$^2$/g) |
|---|---|---|---|
| Embodiment 1 | 0.54 | 2.36 | 5.76 |
| Embodiment 2 | 0.36 | 2.18 | 6.8 |
| Embodiment 3 | 0.45 | 2.45 | 5.6 |
| Reference Example | 0.25 | 1.58 | 3.08 |

It can be known from the data in Table 1 that the aluminum content in the aluminum doped cobalt oxide obtained by the present invention is much higher than that in the aluminum doped cobalt oxide prepared in the reference example. Moreover, the tap density and the specific surface area of the aluminum doped cobalt oxide obtained by the present invention are much higher than those of the aluminum doped cobalt oxide prepared in the reference example.

Test Example

The aluminum doped cobalt oxide obtained in the embodiments of the present invention and the aluminum doped cobalt oxide obtained in the reference example are respectively assembled into lithium cobalt oxide batteries, the electrochemical performance of the lithium cobalt oxide batteries is tested, and the results are shown in the table below.

Table 2 shows test data of the specific discharge capacity and the capacity retention rate after cycles of lithium cobalt oxide batteries assembled from the aluminum doped cobalt oxide obtained in embodiments 1-3 and the reference example.

TABLE 2

| | Initial specific discharge capacity at 0.5 C rate (mAh/g) | Capacity retention rate after 100 charge-discharge cycles (%) |
|---|---|---|
| Embodiment 1 | 182 | 96.3 |
| Embodiment 2 | 178 | 95.2 |

TABLE 2-continued

| | Initial specific discharge capacity at 0.5 C rate (mAh/g) | Capacity retention rate after 100 charge-discharge cycles (%) |
|---|---|---|
| Embodiment 3 | 184 | 96.8 |
| Reference Example | 140 | 92.5 |

In conclusion, the present invention enables doped aluminum to be perfectly embedded into cobalt oxide lattices by the method of adding a cobalt salt solution for coprecipitation reaction first and then adding an aluminum cobalt solution for coprecipitation reaction after a certain particle size is reached so that aluminum doped cobalt oxide has the tap density up to 2.36 g/cm$^3$ and the specific surface area up to 6.8 m$^2$/g, thus effectively enhancing the tap density and uniformity of the aluminum doped cobalt oxide and improving the cycle performance, charge-discharge performance and current density of batteries.

The above is just one concrete embodiment of the present invention, but the protection scope of the present invention is not limited thereto. Any change or replacement contemplated easily by those skilled in the art familiar with the technical field within the technical scope disclosed by the present invention shall be covered within the protection scope of the present invention. Therefore, the protection scope of the present invention should be determined by the protection scope of the claims.

The invention claimed is:

1. A preparation method for high density aluminum doped cobalt oxide, comprising following steps:
    step 1: adding a cobalt salt solution, an alkaline solution and an oxidizer to a reactor for coprecipitation reaction and obtain precipitation products; adding an aluminum cobalt solution to reaction system for reaction after the precipitation products' D50 reaches 2.0-2.5 μm; and stopping adding the aluminum cobalt solution after the precipitation products' D50 reaches 3.5-4.0 μm, keeping other conditions unchanged, continuing the reaction, and stopping the reaction when the precipitation products' D50 reaches a desired particle size, thus obtaining aluminiferous cobalt oxyhydroxide slurry;
    step 2: aging, dehydrating, washing and drying the aluminiferous cobalt oxyhydroxide slurry obtained in step 1, thus obtaining aluminiferous cobalt oxyhydroxide powder; and
    step 3: calcining the aluminiferous cobalt oxyhydroxide powder obtained in step 2, thus obtaining high density aluminum doped cobalt oxide.

2. The preparation method for high density aluminum doped cobalt oxide as claimed in claim 1, wherein in step 1, a specific method of stopping adding the aluminum cobalt solution after the precipitation products' D50 reaches 3.5-4.0 μm, keeping other conditions unchanged, continuing the reaction, and stopping the reaction when D50 reaches the desired particle size is as follows:
    after the precipitation products' D50 reaches 3.5-4.0 μm, stopping adding the aluminum cobalt solution and continuing adding the cobalt salt solution; after liquid in the reactor overflows, thickening the overflowing slurry, draining supernatant, returning the thick slurry to the reactor to continue reaction, and stopping the reaction when D50 reaches the desired particle size.

3. The preparation method for high density aluminum doped cobalt oxide as claimed in claim 2, wherein in step 1, the feed rate of the cobalt salt solution is 220-260 L/h, the feed rate of the alkaline solution is 50-150 L/h, the feed rate of the oxidizer is 20-30 L/h, and the stirring rate during feeding is 300-600 rpm.

4. The preparation method for high density aluminum doped cobalt oxide as claimed in claim 3, wherein in step 1, the concentration of cobalt ions in the cobalt salt solution is 120-140 g/L, the concentration of the alkaline solution is 80-150 g/L, and the oxidizer is one of air, oxygen or hydrogen peroxide.

5. The preparation method for high density aluminum doped cobalt oxide as claimed in claim 4, wherein in step 1, the concentration of cobalt in the aluminum cobalt solution is 120-140 g/L, and the concentration ratio of cobalt ions to aluminum ions in the aluminum cobalt solution is 100:0.5-1.

6. The preparation method for high density aluminum doped cobalt oxide as claimed in claim 5, wherein the cobalt salt solution and the aluminum cobalt solution both contain a complexing agent, and the concentration ratio of cobalt ions to the complexing agent in the cobalt salt solution is 0.04-0.1; and the concentration ratio of cobalt ions to the complexing agent in the aluminum cobalt solution is 0.04-0.1.

7. The preparation method for high density aluminum doped cobalt oxide as claimed in claim 6, wherein in step 1, the reactor contains a base solution with the pH value of 9-11.

8. The preparation method for high density aluminum doped cobalt oxide as claimed in claim 7, wherein in step 2, deionized water of 80-90° C. is used for washing, and the drying temperature is 120-180° C.

9. The preparation method for high density aluminum doped cobalt oxide as claimed in claim 8, wherein in step 3, the calcining temperature is 500-750° C., and the calcining time is 10-20 h.

10. The preparation method for high density aluminum doped cobalt oxide as claimed in claim 1, further comprising a step of washing and drying the high density aluminum doped cobalt oxide obtained in step 3.

11. The preparation method for high density aluminum doped cobalt oxide as claimed in claim 2, further comprising a step of washing and drying the high density aluminum doped cobalt oxide obtained in step 3.

12. The preparation method for high density aluminum doped cobalt oxide as claimed in claim 3, further comprising a step of washing and drying the high density aluminum doped cobalt oxide obtained in step 3.

13. The preparation method for high density aluminum doped cobalt oxide as claimed in claim 4, further comprising a step of washing and drying the high density aluminum doped cobalt oxide obtained in step 3.

14. The preparation method for high density aluminum doped cobalt oxide as claimed in claim 5, further comprising a step of washing and drying the high density aluminum doped cobalt oxide obtained in step 3.

15. The preparation method for high density aluminum doped cobalt oxide as claimed in claim 6, further comprising a step of washing and drying the high density aluminum doped cobalt oxide obtained in step 3.

16. The preparation method for high density aluminum doped cobalt oxide as claimed in claim 7, further comprising a step of washing and drying the high density aluminum doped cobalt oxide obtained in step 3.

17. The preparation method for high density aluminum doped cobalt oxide as claimed in claim 8, further comprising a step of washing and drying the high density aluminum doped cobalt oxide obtained in step 3.

18. The preparation method for high density aluminum doped cobalt oxide as claimed in claim 9, further comprising a step of washing and drying the high density aluminum doped cobalt oxide obtained in step 3.

* * * * *